United States Patent
Ishida et al.

(10) Patent No.: US 11,201,461 B2
(45) Date of Patent: Dec. 14, 2021

(54) POWER CONTROL SYSTEM AND CONTROL DEVICE FOR RESTORING AC SYSTEM FROM POWER FAILURE

(71) Applicant: Mitsubishi Electric Corporation, Tokyo (JP)

(72) Inventors: Keisuke Ishida, Tokyo (JP); Takayuki Fujisawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 64 days.

(21) Appl. No.: 16/618,520

(22) PCT Filed: Jun. 8, 2017

(86) PCT No.: PCT/JP2017/021286
§ 371 (c)(1),
(2) Date: Dec. 2, 2019

(87) PCT Pub. No.: WO2018/225208
PCT Pub. Date: Dec. 13, 2018

(65) Prior Publication Data
US 2020/0161852 A1    May 21, 2020

(51) Int. Cl.
*H02J 3/36* (2006.01)
*H02M 7/483* (2007.01)
(Continued)

(52) U.S. Cl.
CPC ............. *H02H 7/22* (2013.01); *H02J 3/1878* (2013.01); *H02J 3/36* (2013.01); *H02M 7/53871* (2013.01)

(58) Field of Classification Search
CPC ... H02M 7/5387–53873; H02M 7/483; H02M 2007/4835; H02H 7/22; H02H 3/08; H02J 3/1878; H02J 3/36; H02J 3/00125
See application file for complete search history.

(56) References Cited

U.S. PATENT DOCUMENTS 4,264,951 A * 4/1981 Konishi ................ H02J 3/1878
                                                            363/35
5,701,239 A * 12/1997 Bjorklund ............... H02J 3/36
                                                            363/35
(Continued)

FOREIGN PATENT DOCUMENTS

JP       H07203631     *   7/1995
JP       H07203631 A       8/1995
(Continued)

OTHER PUBLICATIONS

Machine English translation of JP2013179781 Kikuki Converter, and Control Method and Control Program Sep. 2013 Ma Toshia (Year: 2013).*
(Continued)

*Primary Examiner* — Sisay G Tiku
(74) *Attorney, Agent, or Firm* — Buchanan Ingersoll & Rooney PC

(57) ABSTRACT

A power system includes: a self-commutated power converter including a first arm and a second arm, each including switching elements; a first circuit breaker configured to interrupt a current flowing through a power transmission line provided between a first bus and a second bus; a first circuit breaker control unit configured to control the first circuit breaker; a converter control unit configured to stop the switching elements based on a first arm current value and a second arm current value; and a setting unit configured to set a voltage value of an AC voltage output from the power converter such that when a fault occurs in the power transmission line, the first circuit breaker is opened while the switching elements are not stopped. The converter control unit is configured to operate the switching elements such that an AC voltage with the set voltage value is output.

12 Claims, 10 Drawing Sheets

(51) Int. Cl.
*H02M 7/5387* (2007.01)
*H02H 7/22* (2006.01)
*H02J 3/18* (2006.01)

(56) References Cited

U.S. PATENT DOCUMENTS

| | | | | |
|---|---|---|---|---|
| 5,815,385 | A * | 9/1998 | Hyttinen | H02J 3/36 363/34 |
| 6,323,618 | B1 * | 11/2001 | Kitamura | H02J 3/1885 318/700 |
| 9,602,021 | B2 * | 3/2017 | Chaudhuri | H02J 3/36 |
| 9,722,507 | B2 * | 8/2017 | Nakazawa | H02M 1/32 |
| 10,819,217 | B2 * | 10/2020 | Ido | H02M 7/48 |
| 2016/0126880 | A1 * | 5/2016 | Choi | H02P 1/029 318/503 |
| 2018/0013280 | A1 * | 1/2018 | Barker | H02J 3/36 |
| 2019/0386578 | A1 * | 12/2019 | Kajiyama | H02M 7/1552 |
| 2020/0287455 | A1 * | 9/2020 | Okuyama | H02J 3/1842 |
| 2021/0021129 | A1 * | 1/2021 | Fujisawa | H02J 3/34 |
| 2021/0099102 | A1 * | 4/2021 | Tahata | H02M 1/088 |

FOREIGN PATENT DOCUMENTS

| | | | |
|---|---|---|---|
| JP | 2005245136 A | | 9/2005 |
| JP | 2013179781 | * | 2/2013 |
| JP | 2013172624 A | | 9/2013 |
| JP | 2013179781 A | | 9/2013 |

OTHER PUBLICATIONS

Machine English translation of JPH07203631 Otsuki Midori Control Equipment for Self-Excited Alternating-Current-To-Direct-Current Converter (Year: 1995).*
IEEE power & energy magazine, January/Feb. 2014, Dec. 17, 2013, pp. 44-53.
International Search Report (PCT/ISA/210) dated Aug. 22, 2017, by the Japan Patent Office as the International Searching Authority for International Application No. PCT/JP2017/021286.
Japanese Office Action (Notice of Reasons for Refusal) dated Dec. 27, 2017, issued in Japanese Patent Application No. 2017-558568, and a English Translation thereof. (8 pages).
Written Opinion (PCT/ISA/237) dated Aug. 22, 2017, by the Japan Patent Office as the International Searching Authority for International Application No. PCT/JP2017/021286.

* cited by examiner

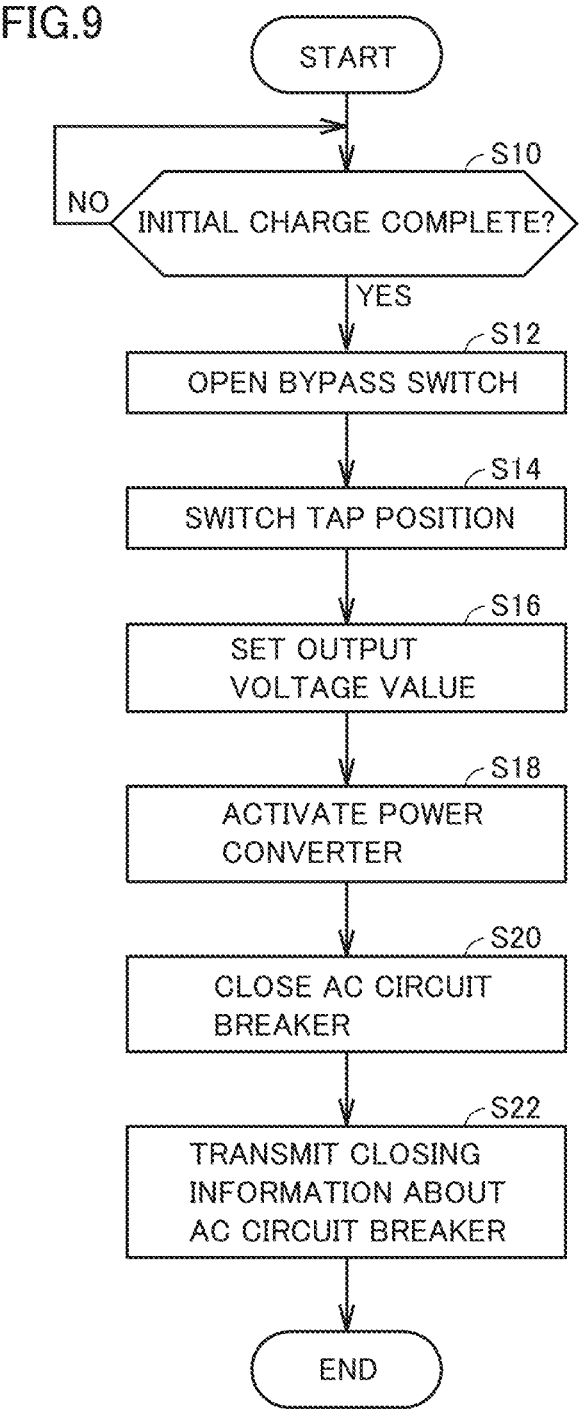

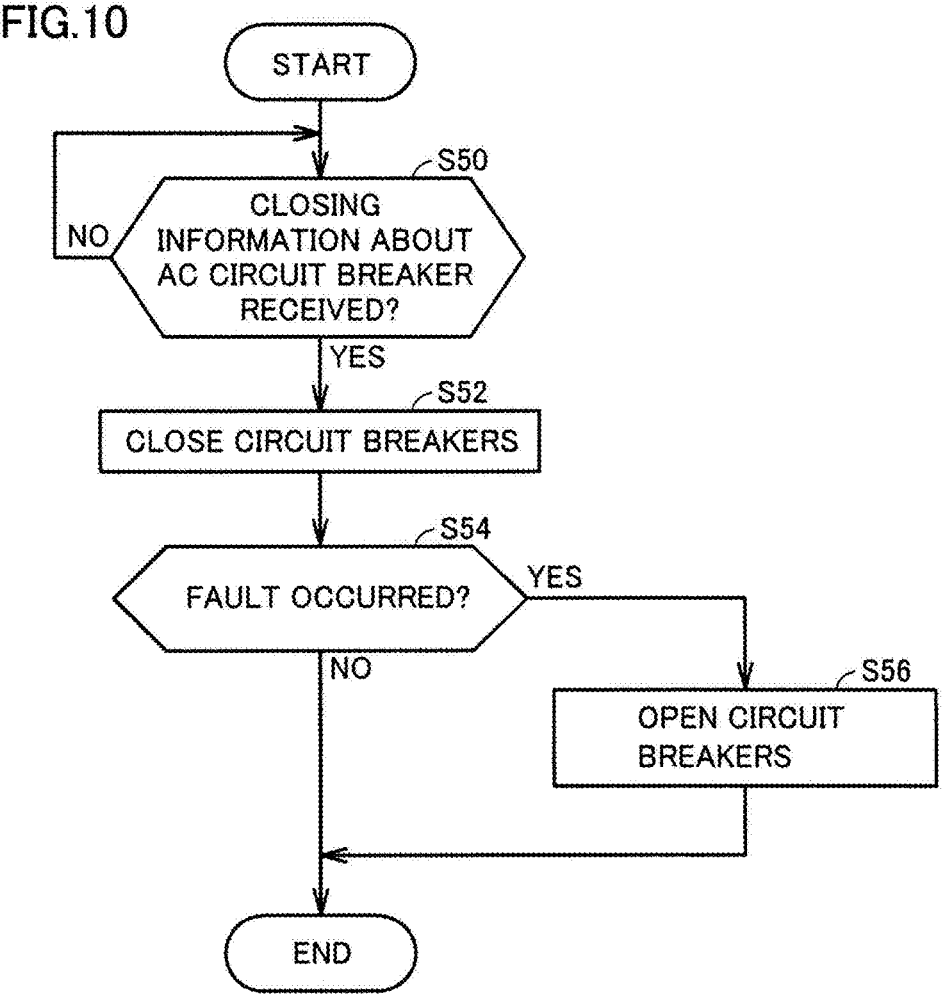

POWER CONTROL SYSTEM AND CONTROL DEVICE FOR RESTORING AC SYSTEM FROM POWER FAILURE

TECHNICAL FIELD

The present disclosure relates to a power control system and a control device.

BACKGROUND ART

A recent increase in power demand leads to higher expectations for high-voltage direct current (DC) power transmission as means for large-capacity, long-distance power transmission and power interchange between different frequency systems. High-voltage DC power transmission can reduce a power transmission loss and the cost of power transmission line equipment, and accordingly, is more cost-effective than alternating current (AC) power transmission in long-distance power transmission. Thus, high-voltage DC power transmission has rapidly become widespread domestically and internationally.

In high-voltage DC power transmission, a power converter is used that converts the power of an AC system to DC power or converts the DC power flowing through a DC line to AC power. Although an external commutated converter including a thyristor has been conventionally used as a power converter, a self-commutated voltage type converter has recently been used.

According to NPL 1, for example, the following is studied. If a power failure occurs in an AC system to be connected to a self-commutated power converter due to a system fault or the like, the self-commutated power converter is regarded as a voltage source to restore the AC system from the power failure.

CITATION LIST

Non Patent Literature

NPL 1: IEEE Power & Energy Magazine, January/February 2014, issued on Dec. 17, 2013, pp. 44-53

SUMMARY OF INVENTION

Technical Problem

A restoration procedure disclosed in NPL 1, however, is built on a premise that a fault on the AC system side has been removed and does not take in consideration a problem that may occur when a fault has not been removed.

An object according to one aspect of the present disclosure is to provide a power control system and a control device capable of appropriately restoring an AC system from a power failure even when a fault in the AC system has not been removed completely.

Solution to Problem

A power control system according to an embodiment includes a self-commutated power converter, a first circuit breaker, a first circuit breaker control unit, a converter control unit, and a setting unit. The self-commutated power converter includes a first arm and a second arm, each including one or more switching elements, and is configured to perform power conversion between a DC system and an AC system. The first circuit breaker is configured to interrupt a current flowing through a power transmission line provided between a first bus and a second bus of the AC system. The first circuit breaker control unit is configured to control the first circuit breaker based on a quantity of electricity of the power transmission line. The converter control unit is configured to stop the one or more switching elements based on a value of a first arm current flowing through the first arm and a value of a second arm current flowing through the second arm. The setting unit is configured to set a voltage value of an AC voltage output from the power converter such that when a fault occurs in the power transmission line, the first circuit breaker is opened while the one or more switching elements are not stopped. The converter control unit is configured to operate the one or more switching elements such that an AC voltage with the voltage value set by the setting unit is output.

According to another embodiment, a control device for controlling a self-commutated power converter configured to perform power conversion between a DC system and an AC system is provided. The power converter includes a first arm and a second arm each including one or more switching elements. The control device includes a converter control unit and a setting unit. The converter control unit is configured to stop the one or more switching elements based on a value of a first arm current flowing through the first arm and a value of a second arm current flowing through the second arm. The setting unit is configured to set a voltage value of an AC voltage output from the power converter such that when a fault occurs in a power transmission line provided between a first bus and a second bus of the AC system, a circuit breaker configured to interrupt a current flowing through the power transmission line based on a quantity of electricity of the power transmission line is opened while the one or more switching elements are not stopped. The converter control unit is configured to operate the one or more switching elements such that an AC voltage with a voltage value set by the setting unit is output.

Advantageous Effects of Invention

The present disclosure enables appropriate restoration of an AC system from a power failure even when a fault in the AC system has not been removed completely.

BRIEF DESCRIPTION OF DRAWINGS

FIG. 9 is a flowchart showing steps of a procedure of the control device.

FIG. 10 is a flowchart showing steps of a procedure of the protection device.

DESCRIPTION OF EMBODIMENTS

Embodiments of the present invention will be described below in detail with reference to the drawings. The same or corresponding parts are designated by the same references, and description thereof will not be repeated.

<System Configuration>

(General Configuration)

Figure 1:
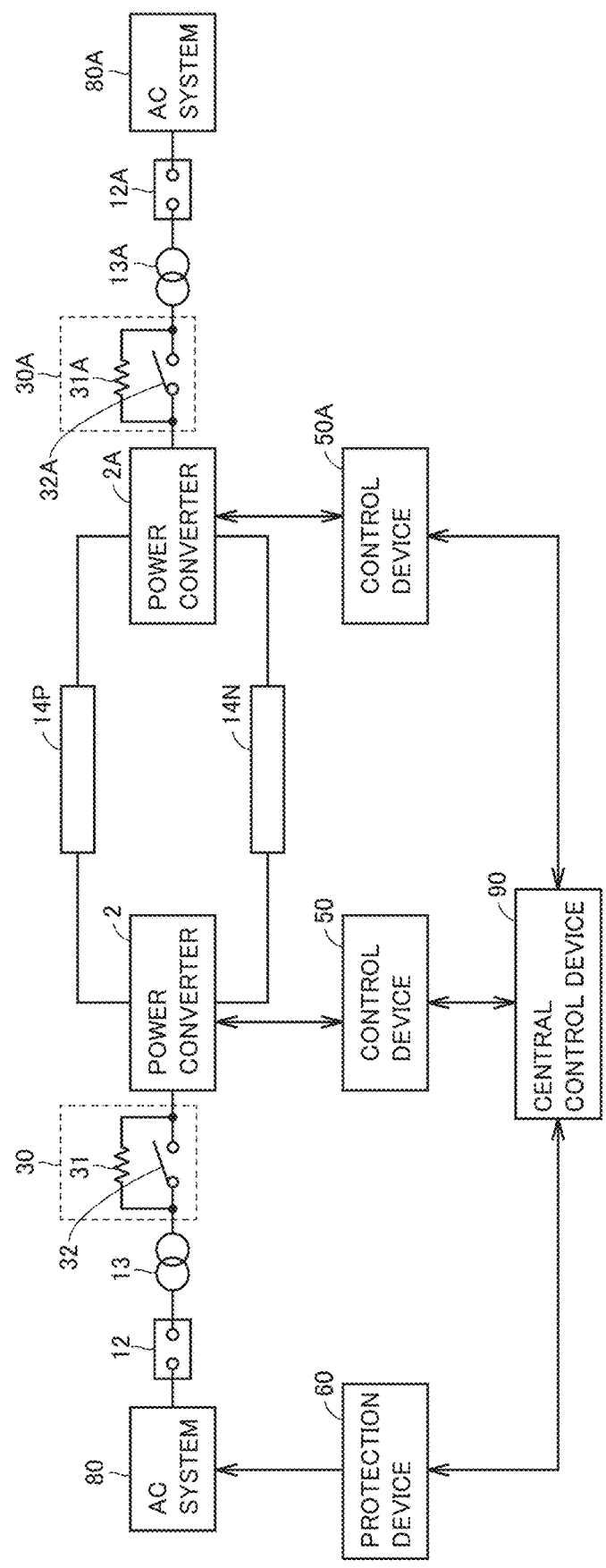
FIG. 1 shows an example of a schematic configuration of a power control system.

FIG. 1 shows an example of a schematic configuration of a power control system. Referring to FIG. 1, the power control system is a system for controlling power of a DC power transmission system of a single-pole configuration. Power is transmitted and received between two AC systems 80 and 80A through a DC power transmission line 14P on a positive side of a DC system and a DC power transmission line 14N on a negative side of the DC system.

AC system 80 is connected to a power converter 2 through an AC circuit breaker 12, a transformer 13, and a limiter circuit 30. AC system 80A is connected to a power converter 2A through an AC circuit breaker 12A, a transformer 13A, and a limiter circuit 30A. Power converters 2 and 2A are connected to DC power transmission lines 14P and 14N (hereinafter collectively referred to as "DC power transmission line 14" as well).

In the present embodiment, power is transmitted from AC system 80A to AC system 80. Specifically, power converter 2A operates as a rectifier (REC), and power converter 2 operates as an inverter (INV). In this case, power converter 2A converts AC power to DC power, and the converted DC power is DC-transmitted through DC power transmission lines 14P and 14N. The DC power is then converted to AC power by power converter 2 at the receiving end, and the AC power is supplied to AC system 80 through transformer 13. When power converter 2A operates as the inverter and power converter 2 operates as the rectifier, a conversion operation is performed in an opposite manner.

Control device 50 controls the operation of power converter 2, and control device 50A controls the operation of power converter 2A. Protection device 60 performs various processes for protecting AC system 80. A central control device 90 corresponds to a higher-order device of each of control devices 50 and 50A and protection device 60. Central control device 90 is configured to communicate with each of control devices 50 and 50A and protection device 60, and relays information between the devices and provides an instruction to each device.

Limiter circuit 30 limits a current flowing between AC system 80 and power converter 2. Limiter circuit 30 includes a limiting resistor 31 and a bypass switch 32 connected in parallel with limiting resistor 31. Bypass switch 32 is controlled to be opened and closed by control device 50.

Transformer 13 is, for example, a tapped transformer that switches a plurality of taps provided in a primary winding and adjusts a voltage by operating a transformation ratio. Tap positions are controlled by control device 50.

Power converter 2A, AC circuit breaker 12A, transformer 13A, limiter circuit 30A, and control device 50A typically have configurations similar to those of power converter 2, AC circuit breaker 12, transformer 13, limiter circuit 30, and control device 50, respectively.

Figure 2:
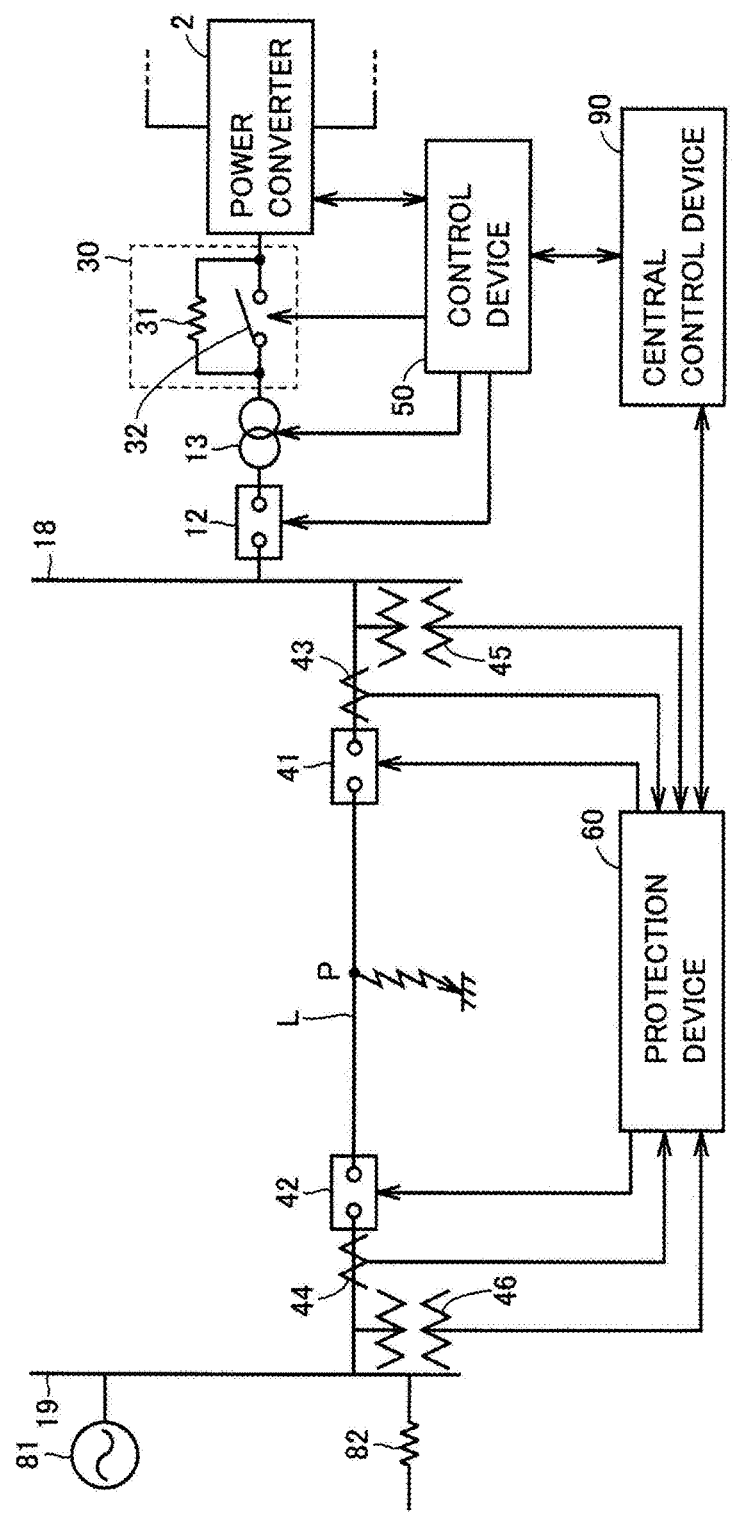
FIG. 2 is a diagram for illustrating a schematic configuration of an AC system.

FIG. 2 is a diagram for illustrating a schematic configuration of AC system 80. AC system 80 includes AC buses 18 and 19, a power transmission line L, a generator 81, and a load 82. For example, power transmission line L is a three-phase, two-line power transmission line.

AC bus 18 is connected to power converter 2 through AC circuit breaker 12, transformer 13, and limiter circuit 30. A power transmission line L is provided between AC bus 18 and AC bus 19. Each of AC buses 18 and 19 is connected with a circuit breaker that opens and closes between the AC bus and power transmission line L. Specifically, circuit breaker 41 opens and closes between AC bus 18 and power transmission line L, and circuit breaker 42 opens and closes between AC bus 19 and power transmission line L. In other words, circuit breakers 41 and 42 pass or interrupt a current flowing through power transmission line L in accordance with a control command from protection device 60.

AC bus 19 is connected with generator 81 and load 82. Generator 81 is, for example, a hydro generator that can be activated in a relatively short period of time. Load 82 is, for example, a customer such as a factory or an ordinary house.

Control device 50 controls, for example, the operation of power converter 2, opening and closing of bypass switch 32, the tap positions of transformer 13, and opening and closing of AC circuit breaker 12. A detailed process performed by control device 50 will be described below.

Protection device 60 acquires the quantity of electricity (e.g., current or voltage) used for protection control of power transmission line L. Specifically, protection device 60 acquires a value of a power transmission line current flowing through each line of power transmission line L from AC current detectors 43 and 44 and acquires each phase voltage of power transmission line L from voltage detectors 45 and 46. Protection device 60 performs a predetermined protection computation (relay computation) based on these quantities of power, and when determining that a fault has occurred in power transmission line L based on the result of the protection computation, transmits trip commands to circuit breakers 41 and 42 to open circuit breakers 41 and 42 (controls circuit breakers 41 and 42 to enter OFF state). Protection device 60 can include various relay computation elements such as an overcurrent relay, an overvoltage relay, an undervoltage relay, and a current differential relay.

(Configuration of Power Converter)

Figure 3:
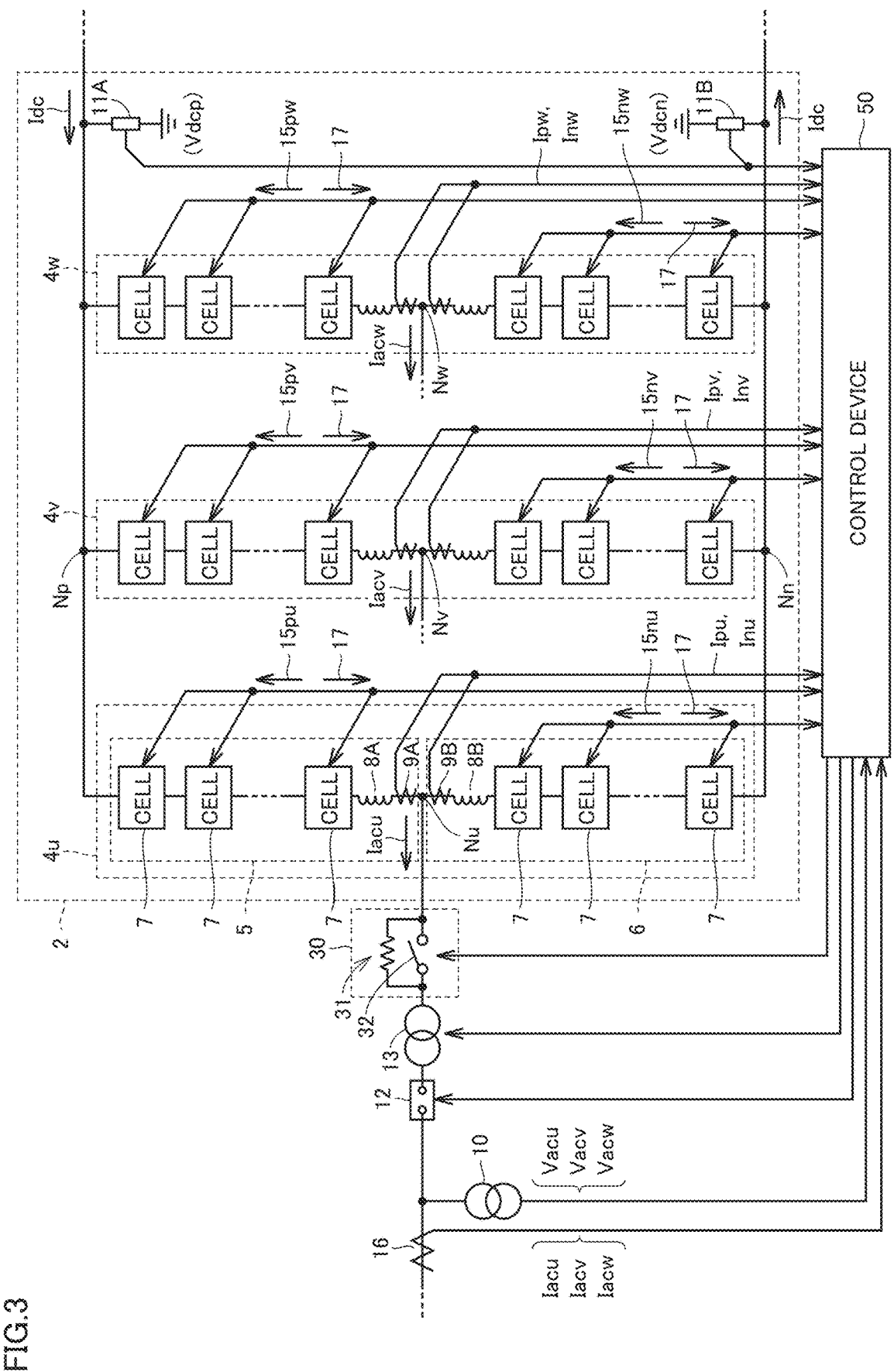
FIG. 3 schematically shows a configuration of a power converter.

FIG. 3 shows a schematic configuration of the power converter. Referring to FIG. 3, power converter 2 is formed of a self-commutated voltage-type power converter. Specifically, power converter 2 is formed of a modular multilevel converter including a plurality of series-connected submodules (corresponding to "cells" in FIG. 3) 7. "Submodule" is also referred to as "converter cell". Power converter 2 performs power conversion between a DC system (specifically, DC power transmission lines 14P and 14N) and AC system 80.

Power converter 2 includes a plurality of leg circuits 4u, 4v, and 4w (described as leg circuit 4 when an unspecific one is referred to) connected in parallel with each other between a positive DC terminal (i.e., high-potential-side DC terminal) Np and a negative DC terminal (i.e., low-potential-side DC terminal) Nn.

Leg circuit 4 is provided in each of a plurality of phases constituting an alternating current. Leg circuit 4 is connected between AC system 80 and DC power transmission line 14 and performs power conversion. FIG. 3 shows the case in which AC system 80 is a three-phase AC system, and three leg circuits 4u, 4v, and 4w are provided corresponding to a U-phase, a V-phase, and a W-phase, respectively.

AC input terminals Nu, Nv, and Nw respectively provided in leg circuits 4u, 4v, and 4w are connected to AC system 80 through limiter circuit 30, transformer 13, and AC circuit breaker 12. FIG. 3 does not show the connection between AC input terminals Nv and Nw and limiter circuit 30 for easy understanding. High-potential-side DC terminal Np and low-potential-side DC terminal Nn connected in common to each leg circuit 4 are connected to DC power transmission lines 14P and 14N, respectively.

Primary windings may be provided in leg circuits 4u, 4v, and 4w in place of AC input terminals Nu, Nv, and Nw, respectively, such that leg circuits 4u, 4v, and 4w are connected to transformer 13 in an AC manner via a secondary winding magnetically coupled with the primary windings. In this case, the primary windings may be reactors 8A and 8B described below. In other words, leg circuit 4 is electrically (i.e., in a DC manner or an AC manner) connected to AC system 80 via connections provided in leg circuits 4u, 4v, and 4w, such as AC input terminals Nu, Nv, and Nw or the above primary windings.

Leg circuit 4u includes an upper arm 5 extending from high-potential-side DC terminal Np to AC input terminal Nu and a lower arm 6 extending from low-potential-side DC terminal Nn to AC input terminal Nu. AC input terminal Nu, which is a connecting point between upper arm 5 and lower arm 6, is connected to transformer 13. High-potential-side DC terminal Np and low-potential-side DC terminal Nn are connected to DC power transmission lines 14P and 14N, respectively. Since leg circuits 4v and 4w have a similar configuration, leg circuit 4u will be representatively described below.

Upper arm 5 includes a plurality of cascade-connected submodules 7 and a reactor 8A. Submodules 7 and reactor 8A are connected in series with each other.

Similarly, lower arm 6 includes a plurality of cascade-connected submodules 7 and a reactor 8B. Submodules 7 and reactor 8B are connected in series with each other.

Reactor 8A may be inserted at any position in upper arm 5 of leg circuit 4u, and reactor 8B may be inserted at any position in lower arm 6 of leg circuit 4u. A plurality of reactors 8A and a plurality of reactors 8B may be provided. The reactors may have different inductance values. Further, only reactor 8A of upper arm 5 or reactor 8B of lower arm 6 may be provided.

Reactors 8A and 8B are provided such that a fault current will not increase rapidly in the event of a fault in AC system 80, DC power transmission line 14, or the like. However, excessively high inductance values of reactors 8A and 8B lead to a decrease in the efficiency of a power converter. During a fault, thus, all the switching elements of each submodule 7 are preferably stopped (turned off) in the shortest possible period of time.

Control device 50 obtains a quantity of electricity (e.g., current or voltage) used in control from a plurality of detectors. Specifically, the plurality of detectors include an AC voltage detector 10, an AC current detector 16, DC voltage detectors 11A and 11B, and arm current detectors 9A and 9B provided in each leg circuit 4.

A signal detected by each detector is input to control device 50. Control device 50 outputs operation commands 15*pu*, 15*nu*, 15*pv*, 15*nv*, 15*pw*, and 15*nw* for controlling the operation state of each submodule based on a detection signal. Also, control device 50 receives a signal 17 indicating a detection value of a cell capacitor voltage from each submodule.

In the present embodiment, operation commands 15*pu*, 15*nu*, 15*pv*, 15*nv*, 15*pw*, and 15*nw* are generated corresponding to a U-phase upper arm, a U-phase lower arm, a V-phase upper arm, a V-phase lower arm, a W-phase upper arm, and a W-phase lower arm, respectively. Operation commands 15*pu*, 15*nu*, 15*pv*, 15*nv*, 15*pw*, and 15*nw* will be described as operation command 15 when they are collectively referred to or an unspecific one is referred to.

Although FIG. 3 collectively shows some of signal lines of signals input from the respective detectors to control device 50 and signal lines of signals input and output between control device 50 and the respective submodules, in actuality, they are provided for each detector and each submodule 7. Signal lines between each submodule and control device 50 may be provided separately for transmission and reception. For example, these signals are transmitted through an optical fiber in terms of noise resistance.

Hereinafter, each detector will be specifically described. AC voltage detector 10 detects a U-phase AC voltage value Vacu, a V-phase AC voltage value Vacv, and a W-phase AC voltage value Vacw output from transformer 13 to AC system 80. AC current detector 16 detects a U-phase AC current value Iacu, a V-phase AC current value Iacy, and a W-phase AC current value Iacw output from transformer 13 to AC system 80. DC voltage detector 11A detects a DC voltage value Vdcp of high-potential-side DC terminal Np connected to DC power transmission line 14P. DC voltage detector 11B detects a DC voltage value Vdcn of low-potential-side DC terminal Nn connected to DC power transmission line 14N.

Arm current detectors 9A and 9B provided in leg circuit 4u for U-phase detect an upper arm current Ipu flowing through upper arm 5 and a lower arm current Inu flowing through lower arm 6, respectively. Similarly, arm current detectors 9A and 9B provided in leg circuit 4v for V-phase detect an upper arm current Ipv and a lower arm current Inv, respectively. Arm current detectors 9A and 9B provided in leg circuit 4w for W-phase detect an upper arm current Ipw and a lower arm current Inw, respectively.

(Example Configuration of Submodule)

Figure 4:
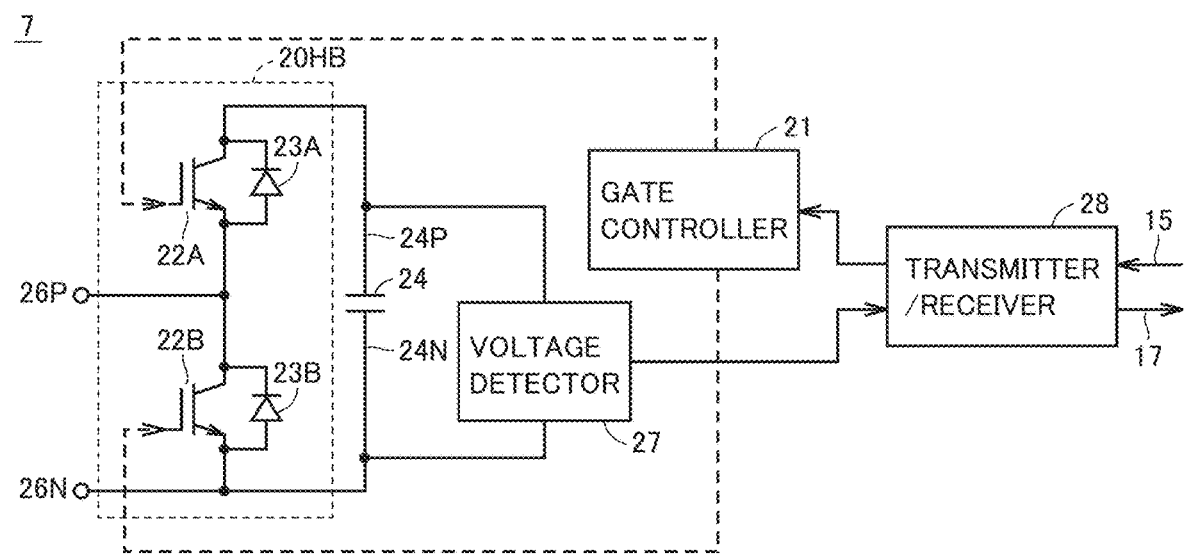
FIG. 4 is a circuit diagram showing an example of a submodule of each leg circuit of FIG. 3.

FIG. 4 is a circuit diagram showing an example of submodules forming each leg circuit of FIG. 3. Submodule 7 shown in FIG. 4 includes a half-bridge conversion circuit 20HB, a DC capacitor 24 serving as an energy storage, a gate controller 21, a voltage detector 27, and a transmitter/receiver 28.

Half-bridge conversion circuit 20HB includes series-connected switching elements 22A and 22B and series-connected diodes 23A and 23B connected in series. Diodes 23A and 23B are connected in anti-parallel (i.e., in parallel and in reverse bias direction) with switching elements 22A and 22B, respectively. DC capacitor 24 is connected in parallel with a series-connected circuit of switching elements 22A and 22B and holds a DC voltage. A connection node between switching elements 22A and 22B is connected to an I/O terminal 26P on the high-potential side. A connection node between switching element 22B and DC capacitor 24 is connected to an I/O terminal 26N on the low-potential side.

Gate controller 21 operates in accordance with an operation command 15 received from control device 50. Gate controller 21 performs control to bring one of switching elements 22A and 22B to ON state and the other switching element to OFF state during normal operation (i.e., when a zero voltage or positive voltage is output between I/O terminals 26P and 26N). When switching element 22A is in ON state and switching element 22B is in OFF state, a voltage across DC capacitor 24 is applied between I/O terminals 26P and 26N. Contrastingly, when switching element 22A is in OFF state and switching element 22B is in ON state, the voltage between I/O terminals 26P and 26N is 0 V.

Thus, submodule 7 shown in FIG. 4 can alternately bring switching elements 22A and 22B to ON state to output a zero voltage or a positive voltage dependent on the voltage across DC capacitor 24. Diodes 23A and 23B are provided for protection upon application of reverse voltages to switching elements 22A and 22B.

When detecting an overcurrent of the arm current, control device 50 transmits a gate block (turning-off of the switching element) command to transmitter/receiver 28. Upon receipt of the gate block command via transmitter/receiver 28, gate controller 21 turns off both of switching elements 22A and 22B for circuit protection. Consequently, for example, in the event of a grounding fault of AC system 80, switching elements 22A and 22B can be protected.

Voltage detector 27 detects a voltage between opposite ends 24P and 24N of DC capacitor 24. In the following description, the voltage across DC capacitor 24 is also referred to as a cell capacitor voltage. Transmitter/receiver 28 transmits operation command 15 received from control device 50 to gate controller 21 and also transmits a signal 17 indicating the cell capacitor voltage detected by voltage detector 27 to control device 50.

Gate controller 21, voltage detector 27, and transmitter/receiver 28 may be implemented by a dedicated circuit or may be implemented by a field programmable gate array (FPGA).

A self-arc-extinguishing-type switching elements capable of controlling both of ON operation and OFF operation is used for each of switching elements 22A and 22B. Switching elements 22A and 22B are, for example, insulated gate bipolar transistors (IGBTs) or gate commutated turn-off thyristors (GCTs).

The configuration of submodule 7 described above is merely an example, and a submodule 7 having another configuration may be used in the present embodiment. For example, submodule 7 may be implemented by a full-bridge conversion circuit or three-quarter-bridge conversion circuit.

<Hardware Configuration of Control Device>

Figure 5:
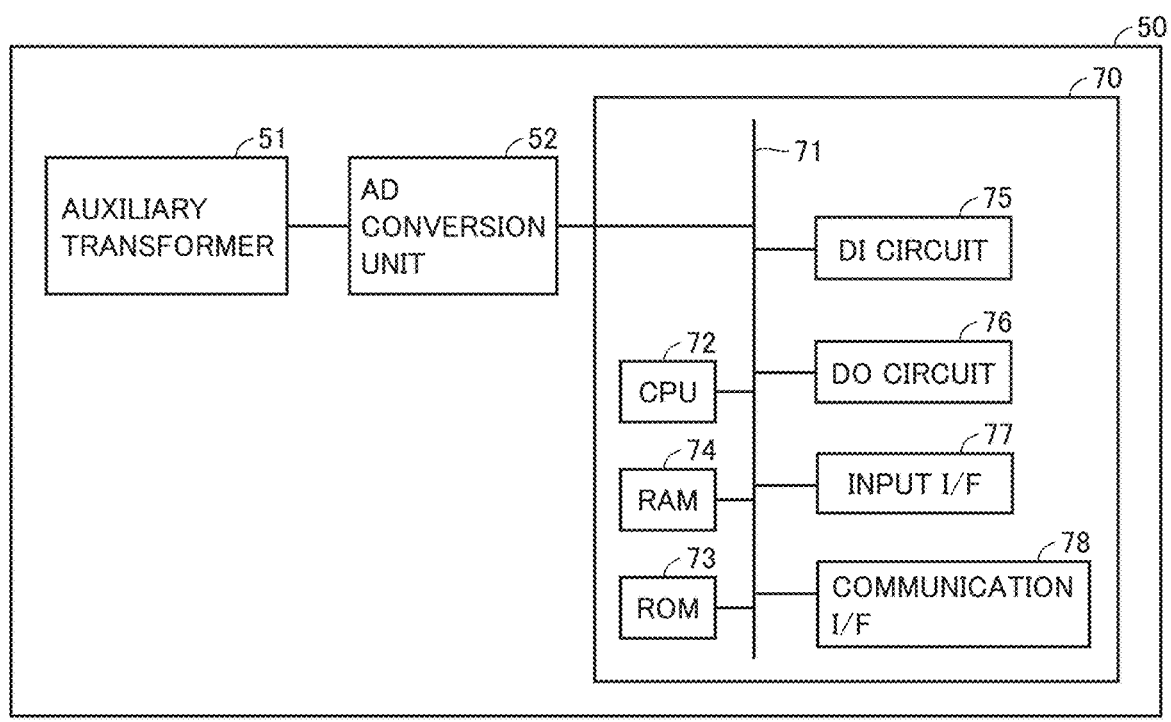
FIG. 5 shows an example of a hardware configuration of a control device.

FIG. 5 shows an example hardware configuration of control device 50. Referring to FIG. 5, control device 50 includes an auxiliary transformer 51, an analog to digital (AD) conversion unit 52, and an operation processing unit 70.

Auxiliary transformer 51 receives a quantity of electricity from each detector, converts it to a smaller quantity of electricity, and outputs a resultant quantity of electricity. AD conversion unit 52 receives the quantity of electricity (analog quantity) output from auxiliary transformer 51 and converts it to digital data. Specifically, AD conversion unit 52 includes an analog filter, a sample hold circuit, a multiplexer, and an AD converter.

The analog filter removes high-frequency noise components from waveform signals of current and voltage output from auxiliary transformer 51. The sample hold circuit samples the waveform signals of current and voltage output from the analog filter in a predetermined sampling period. The multiplexer sequentially switches the waveform signals input from the sample hold circuit in chronological order and inputs them to the AD converter, based on a timing signal input from operation processing unit 70. The AD converter converts the waveform signal input from the multiplexer from analog data to digital data. The AD converter outputs the waveform signal (digital data) subjected to digital conversion to operation processing unit 70.

Operation processing unit 70 includes a central processing unit (CPU) 72, a ROM 73, a RAM 74, a digital input (DI) circuit 75, a digital output (DO) circuit 76, an input interface (I/F) 77, and a communication interface (I/F) 78. These are coupled to each other by a bus 71.

CPU 72 reads and executes a program preliminarily stored in ROM 73, thus controlling the operation of control device 50. ROM 73 stores various types of information to be used by CPU 72. CPU 72 is, for example, a microprocessor. The hardware may be a field programmable gate array (FPGA) other than the CPU, an application specific integrated circuit (ASIC), or any other circuit having a computation function.

CPU 72 receives digital data from AD conversion unit 52 through bus 71. CPU 72 performs a control computation using the received digital data in accordance with the program stored in ROM 73.

CPU 72 outputs a control command to an external apparatus via DO circuit 76 based on a result of the control computation. Also, CPU 72 receives a response to the control command via DI circuit 75. Input interface 77 is typically various buttons or the like and receives various setting operations from a system operator. CPU 72 also transmits and receives various types of information to and from another apparatus (e.g., central control device 90) through communication interface 78.

The hardware configurations of protection device 60 and central control device 90 may be similar to, for example, the hardware configuration of control device 50. Control device 50, protection device 60, and central control device 90 are typically configured as digital protection relays.

<Overview of Operation>

The overview of the operation of the power control system that controls the power of the DC power transmission system will be described with reference to FIGS. 1 and 2. Herein, description will be given to the operation for restoring AC system 80 from a power failure state when AC system 80 is in the power failure state due to a fault occurring in AC system 80 (e.g., a point P in FIG. 2). It is assumed here that in the power failure state, AC circuit breaker 12 and circuit breakers 41 and 42 are opened.

In the present embodiment, since power converter 2 is a self-commutated power converter, AC system 80 can be restored from the power failure state by operating power converter 2 as a voltage source to supply power to AC system 80. For example, control device 50 operates power converter 2 so as to perform a constant voltage constant frequency (CVCF) regulator operation, thereby using power converter 2 as a voltage source. Control device 50 operates power converter 2 to perform an automatic power regulator (APR) operation in normal state. It is assumed here that even during a power failure, various power supplies (power supply for control device, auxiliary power supply) capable of operating power converter 2 are ensured.

When the fault in AC system 80 has been completely removed, a rated voltage is output from power converter 2 operating as a voltage source to AC system 80 to complete the restoration of AC system 80. When the fault has not been removed in AC system 80, however, the following problem may arise.

Specifically, control device 50 activates power converter 2 so as to output a rated voltage, closes AC circuit breaker 12 (brings AC circuit breaker 12 to a closed state), and then supplies power to AC system 80. Subsequently, circuit breakers 41 and 42 are closed sequentially to charge AC system 80. At this time, if a fault point P has not been removed completely, a large fault current flows from the power converter 2 side toward fault point P. In this case, control device 50 detects an overcurrent of each arm, and turns off switching elements 22A and 22B by a gate block command. Herein, a protection operation time for protecting switching elements 22A and 22B is, for example, 100 μs in control device 50.

Normally, circuit breakers 41 and 42 should be opened because the fault current flows toward fault point P of AC system 80. However, the protection relay operation time for protecting power transmission line L is, for example, 40 ms in protection device 60, which is commonly much longer than the protection operation time of control device 50.

Thus, control device 50 brings switching elements 22A and 22B to OFF state before protection device 60 completes the protection computation. Since a voltage output from power converter 2 is accordingly stopped, a command to open circuit breakers 41 and 42 by protection device 60 is not executed though fault point P of AC system 80 has not been removed, and each of circuit breakers 41 and 42 is kept closed. Consequently, a fault point cannot be determined while power converter 2 is operated as a voltage source, requiring an enormous amount of time and effort for the determination.

In the present embodiment, thus, a voltage value of the AC voltage output from power converter 2 in restoration is adjusted such that even when a fault has not been removed in AC system 80 and a current flows from power converter 2 toward the fault point of AC system 80, switching elements 22A and 22B are not turned off but circuit breakers 41 and 42 are opened. Consequently, control device 50 does not detect a current flowing through each arm as an overcurrent large enough to break switching elements 22A and 22B and does not output a gate block command. Meanwhile, protection device 60 determines that a fault has occurred in power transmission line L as a result of the protection computation based on the quantity of electricity of power transmission line L and outputs open commands to circuit breakers 41 and 42.

Figure 6A:
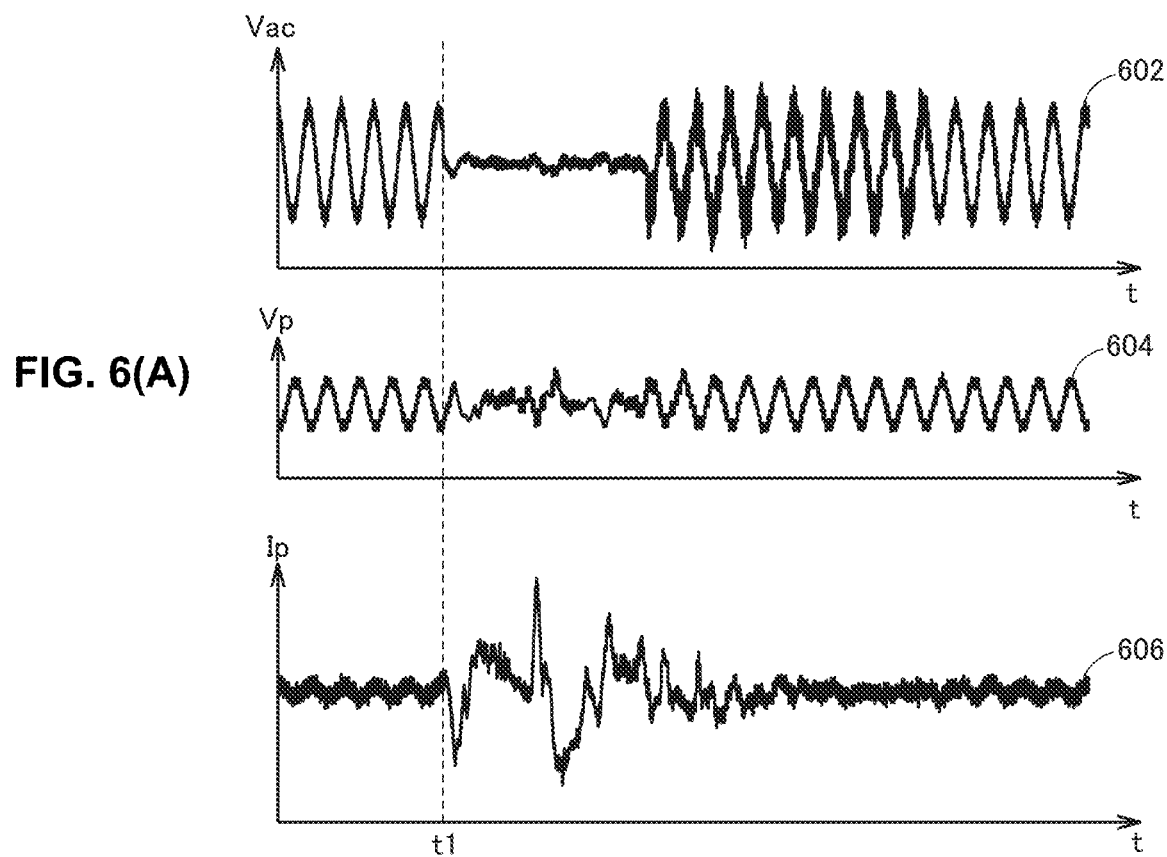
FIGS. 6(A) and 6(B) show simulation results when a one-phase grounding fault has occurred in a power transmission line of an AC system.
Figure 6B:
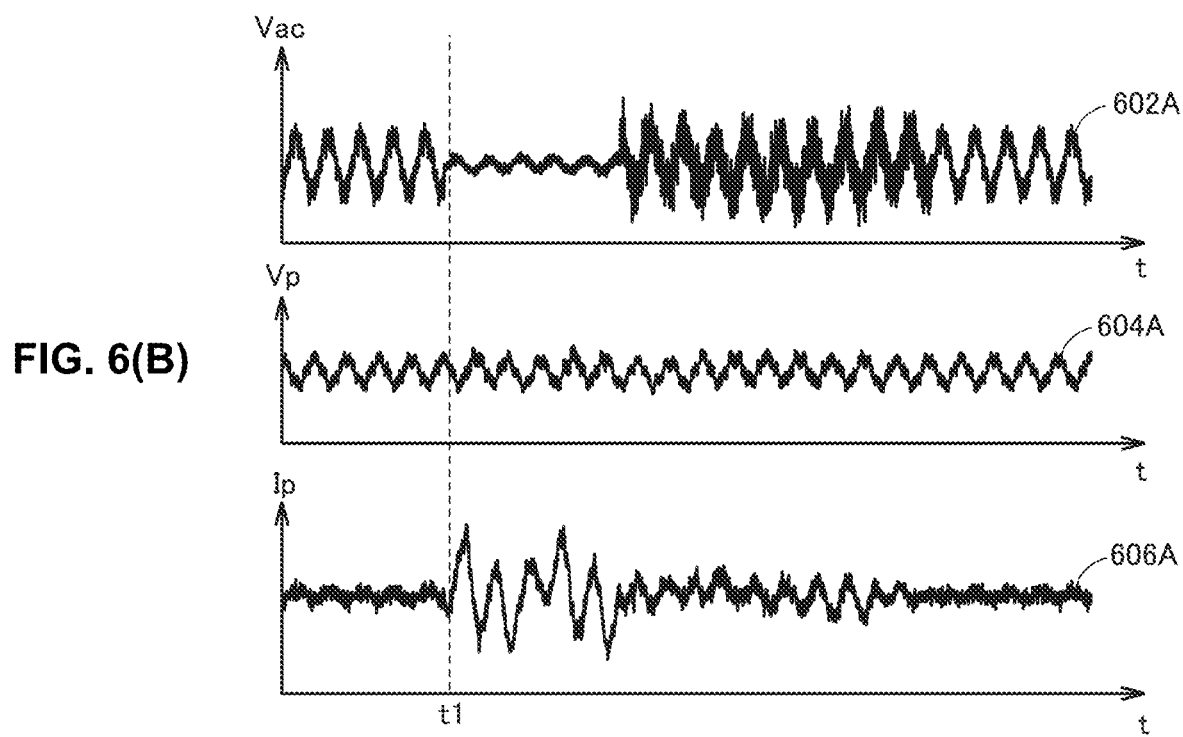

FIG. 6 shows simulation results when a one-phase grounding fault has occurred in the power transmission line of AC system 80. Specifically, FIG. 6(a) shows simulation results when power converter 2 is operated at a rated voltage (1.0 pu). FIG. 6(b) shows simulation results when power converter 2 is operated at a voltage (0.5 pu) lower than the rated voltage.

FIGS. 6(a) and 6(b) show the simulation results when a fault has occurred at a time t1. Graphs 602, 604, and 606 in FIG. 6(a) show an AC voltage value Vac output from transformer 13 to AC bus 18, an arm voltage value Vp of upper arm 5, and an arm current value Ip of upper arm 5, respectively. For example, arm voltage value Vp and arm current value Ip are a voltage value and a current value of U-phase, respectively. Graphs 602A, 604A, and 606A in FIG. 6(b) show an AC voltage value Vac, an arm voltage value Vp, and an arm current value Ip when power converter 2 is operated at 0.5 pu.

In comparison between FIGS. 6(a) and 6(b), during a period before the occurrence of the fault, AC voltage value Vac and arm voltage value Vpu are smaller when power converter 2 has been operated at 0.5 pu than when power converter 2 has been operated at 1.0 pu. Immediately after the occurrence of the fault, arm current value Ip is smaller when power converter 2 has been operated at 0.5 pu than when power converter 2 has been operated at 1.0 pu. This reveals that operating power converter 2 at a voltage lower than the rated voltage can reduce a current flowing through each arm in the occurrence of a one-phase grounding fault.

Figure 7A:
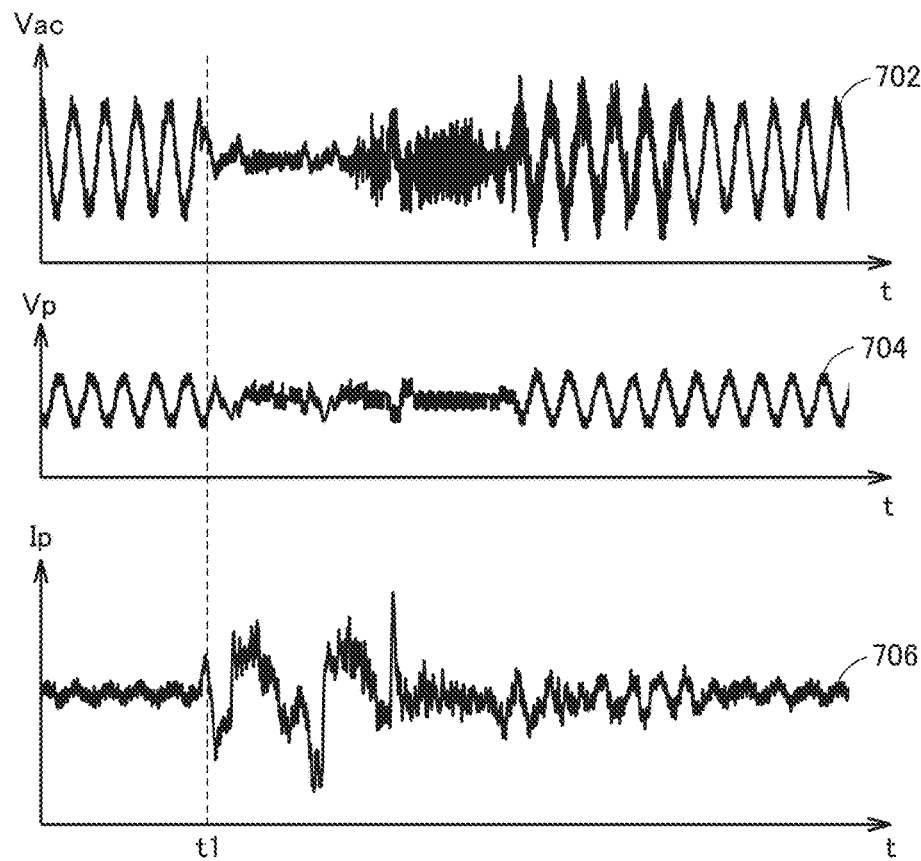
FIGS. 7(A) and 7(B) show simulation results when a two-phase short-circuit fault has occurred in the power transmission line of the AC system.
Figure 7B:
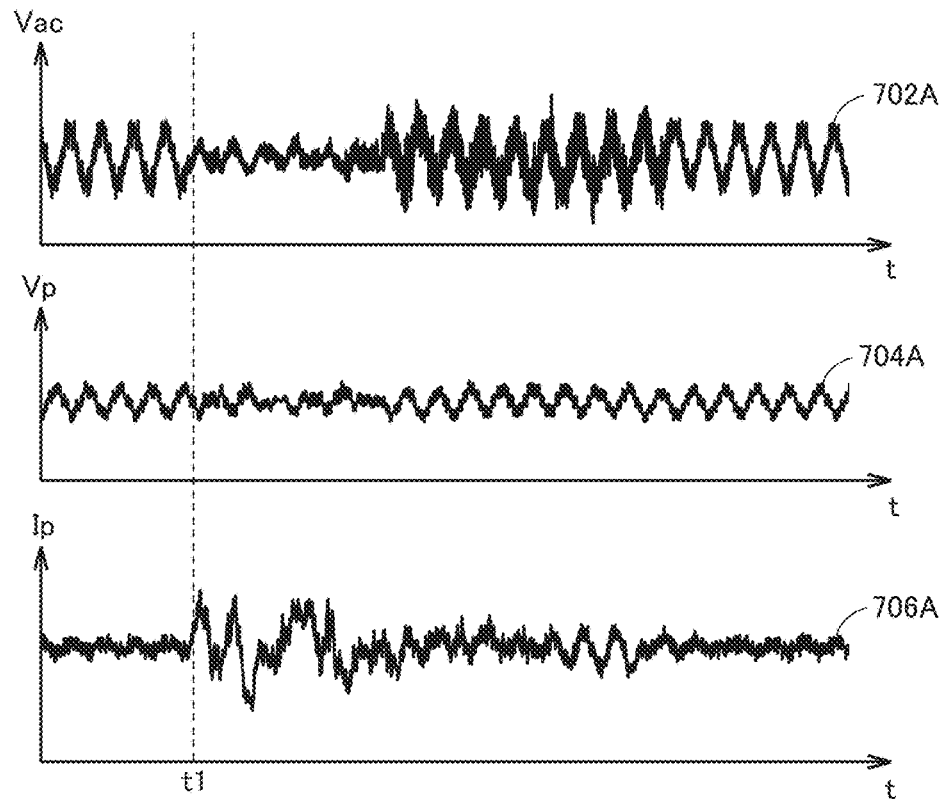

FIGS. 7(a) and 7(b) show simulation results when a two-phase short-circuit fault has occurred in the power transmission line of AC system 80. Specifically, FIG. 7(a) shows simulation results when power converter 2 has been operated at 1.0 pu. FIG. 7(b) shows simulation results when power converter 2 has been operated at 0.5 pu.

Graphs 702, 704, and 706 in FIG. 7(a) show an AC voltage value Vac, an arm voltage value Vp, and an arm current value Ip, respectively, when power converter 2 has been operated at 1.0 pu. Graphs 702A, 704A, and 706A in FIG. 7(b) show an AC voltage value Vac, an arm voltage value Vpu, and an arm current value Ip, respectively, when power converter 2 has been operated at 0.5 pu.

In comparison between FIGS. 7(a) and 7(b), immediately after the occurrence of the fault, arm current value Ip is smaller when power converter 2 has been operated at 0.5 pu than when power converter 2 has been operated at 1.0 pu, as in FIG. 6. This reveals that operating power converter 2 at a voltage lower than the rated voltage can reduce a current flowing through each arm also in the two-phase short-circuit fault.

A set value of the output voltage of power converter 2 is determined through simulations. Specifically, simulations are performed to know an extent to which the output voltage of power converter 2 is reduced from the rated voltage value, where the extent is required to determine that a fault has occurred while switching elements 22A and 22B are not broken. In the present embodiment, the operation level at which protection device 60 outputs open commands to circuit breakers 41 and 42 is lower than the operation level at which control device 50 outputs a gate block command to switching elements 22A and 22B. Specifically, when the current with a current value included in a predetermined range flows from power converter 2, the operation levels of control device 50 and protection device 60 are set such that control device 50 outputs no gate block command and protection device 60 outputs an open command.

As described above, the power control system according to the present embodiment appropriately sets the output voltage value of power converter 2 serving as a voltage source to control a current flowing from power converter 2 in restoration of AC system 80 from a power failure. Even when a fault has not been removed in power transmission line L, thus, circuit breakers 41 and 42 can be opened without turning off switching elements 22A and 22B, thereby smoothly determining a section in which a fault has occurred and restoring an AC system from a power failure.

Control device 50 may be configured to control bypass switch 32 to enter the open state in restoration of AC system 80 from a power failure. This configuration flows a current from power converter 2 through limiting resistor 31, thus preventing or reducing a fault current flowing when a fault has not been removed. Alternatively, control device 50 may be configured to control a tap position such that transformer 13 outputs the smallest voltage to AC system 80. Also this configuration can prevent or reduce a current flowing from power converter 2 to AC system 80. In the employment of the above configuration, a set value of the output voltage of power converter 2 is determined through simulations in consideration of the above configuration.

<Functional Configuration>

Figure 8:
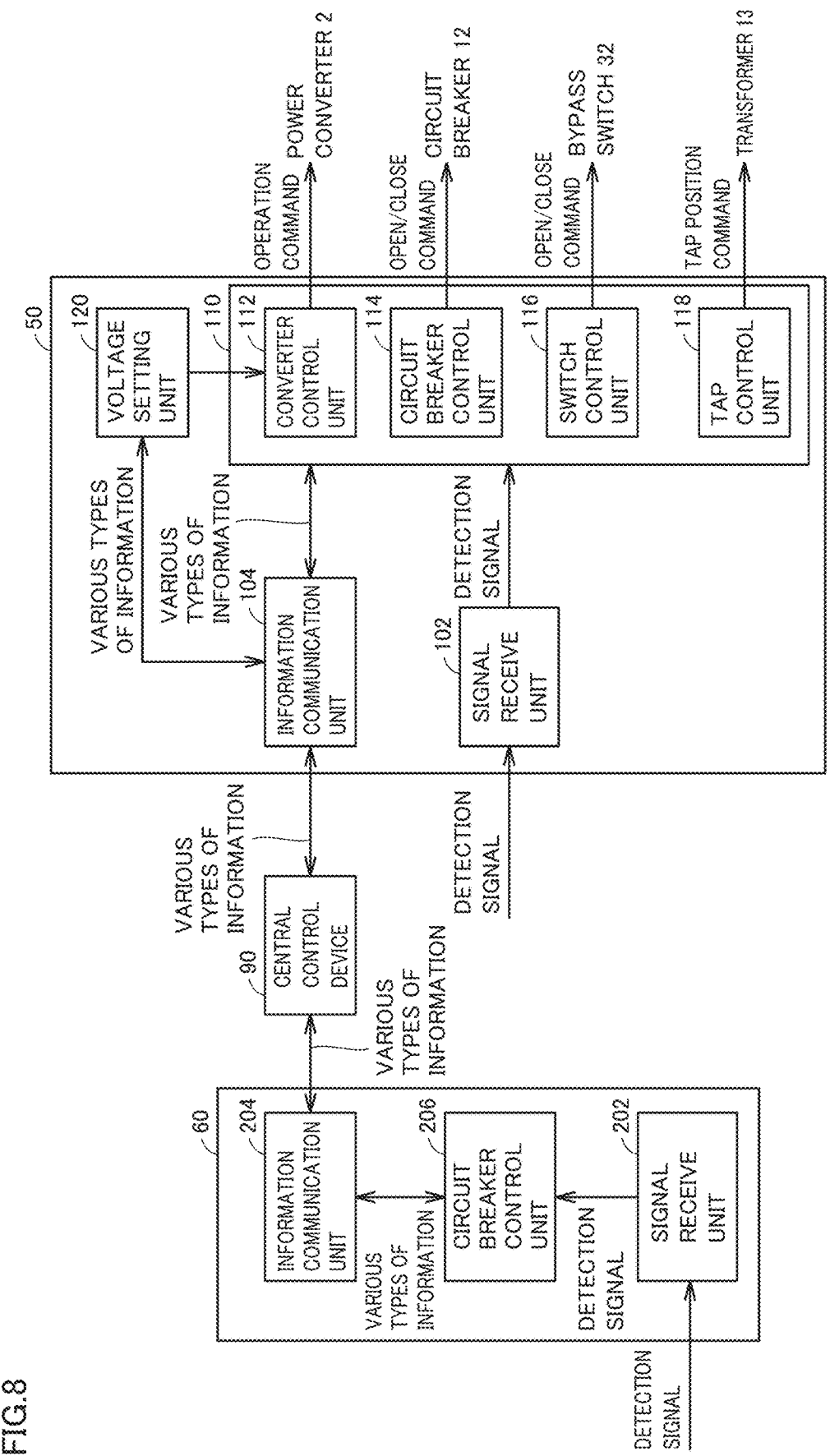
FIG. 8 is a functional block diagram of a control device and a protection device.

FIG. 8 is a functional block diagram of control device 50 and protection device 60. Referring to FIG. 8, control device 50 includes a signal receive unit 102, an information communication unit 104, a command generation unit 110, and a voltage setting unit 120 as main functional components. These components are implemented by, for example, CPU 72 of operation processing unit 70 executing a program stored in ROM 73. Some or all of these components may be configured to be implemented by hardware.

Protection device 60 includes a signal receive unit 202, an information communication unit 204, and a circuit breaker control unit 206 as main functional components. These components are realized by a CPU of protection device 60 executing a program stored in the ROM. Some or all of these components may be configured to be implemented by hardware.

Signal receive unit 202 of protection device 60 receives signals detected by the respective detectors (e.g., AC current detectors 43 and 44, AC voltage detectors 45 and 46) that measure the quantity of electricity used for control.

Information communication unit 204 transmits and receives various types of information to and from central control device 90. Specifically, information communication unit 204 receives information indicating whether AC circuit breaker 12 is open or closed and information indicating whether bypass switch 32 is open or closed from central control device 90. Information communication unit 204 transmits, for example, information indicating whether circuit breakers 41 and 42 are open or closed to central control device 90.

Circuit breaker control unit 206 controls circuit breakers 41 and 42 based on the quantity of electricity of power transmission line L provided between AC bus 18 and AC bus 19. Specifically, circuit breaker control unit 206 performs a protection computation using a signal received from each detector. Circuit breaker control unit 206 determines that a fault has occurred in power transmission line L when the result of the protection computation is equal to or higher than the operation level, and outputs open commands to circuit breakers 41 and 42.

In one aspect, circuit breaker control unit 206 sequentially closes circuit breakers 41 and 42 after converter control unit 112 operates each submodule 7. When detecting a fault in power transmission line L through the protection computation using the quantity of electricity of power transmission line L after circuit breakers 41 and 42 have been closed, circuit breaker control unit 206 opens circuit breakers 41 and 42 and locks circuit breakers 41 and 42 in the open state. In other words, circuit breaker control unit 206 determines that a fault has occurred in power transmission line L and performs control such that circuit breakers 41 and 42 are not closed. In another aspect, when receiving information indicating that AC circuit breaker 12 has been closed, circuit breaker control unit 206 outputs stop commands to circuit breakers 41 and 42.

Signal receive unit 102 of control device 50 receives signals detected by the respective detectors (e.g., AC voltage detector 10, AC current detector 16, DC voltage detectors 11A and 11B, arm current detectors 9A and 9B) used for control.

Information communication unit 104 transmits and receives various types of information to and from central control device 90. Specifically, information communication unit 104 receives, for example, information indicating whether circuit breakers 41 and 42 are open or closed from central control device 90. Information communication unit 104 transmits, for example, information indicating whether AC circuit breaker 12 is open or closed or information indicating whether bypass switch 32 is open or closed to central control device 90.

Command generation unit 110 generates command information for controlling each apparatus and outputs the generated command information. Specifically, command generation unit 110 includes a converter control unit 112, a circuit breaker control unit 114, a switch control unit 116, and a tap control unit 118.

Converter control unit 112 controls the operation of power converter 2. Specifically, converter control unit 112 transmits operation command 15 to each submodule 7 to switch (turn on or off at a predetermined timing) two switching elements 22A and 22B, thereby driving each submodule 7.

In one aspect, converter control unit 112 stops each submodule 7 based on a value of an arm current flowing through upper arm 5 and a value of an arm current flowing through lower arm 6. Specifically, converter control unit 112 determines whether at least one of upper arm currents Ipu, Ipv, and Ipw flowing through upper arms 5 of leg circuits 4$u$, 4$v$, and 4$w$ and lower arm currents Inu, Inv, and Inw flowing through lower arm 6 exceeds a threshold, that is, whether an overcurrent flows through at least one of the arms. When at least one of the arm currents exceeds the threshold, converter control unit 112 determines that a fault has occurred and outputs a stop command for stopping each submodule 7. Herein, stopping of submodule 7 means that submodule 7 outputs no voltage by, for example, stopping (turning off) switching elements 22A and 22B.

Circuit breaker control unit 114 controls AC circuit breaker 12 provided between AC bus 18 and power converter 2. Specifically, circuit breaker control unit 114 outputs an open/close command to AC circuit breaker 12, thereby controlling the open/closed state of AC circuit breaker 12. In one aspect, circuit breaker control unit 114 closes AC circuit breaker 12 after converter control unit 112 operates each submodule 7 and before circuit breaker control unit 206 closes circuit breakers 41 and 42.

Switch control unit 116 outputs an open/close command to bypass switch 32, thereby controlling opening and closing of bypass switch 32. In one aspect, switch control unit 116 opens bypass switch 32 before converter control unit 112 operates each submodule 7.

Tap control unit 118 performs switch control for switching a top position of transformer 13 provided between AC bus 18 and power converter 2. Specifically, tap control unit 118 outputs a tap position command for instructing tap up command (or tap down control) to transformer 13. In one aspect, tap control unit 118 switches to a tap position at which the voltage output from transformer 13 to AC bus 18 has the lowest voltage value before converter control unit 112 operates each submodule 7.

When a fault has occurred in power transmission line L of AC system 80, voltage setting unit 120 sets a voltage value of an AC voltage output from power converter 2 such that protection device 60 (specifically, circuit breaker control unit 206) opens circuit breakers 41 and 42 while submodule 7 are not stopped by converter control unit 112. Converter control unit 112 operates each submodule 7 such that the AC voltage with the voltage value set by voltage setting unit 120 is output.

<Steps of Procedure>

FIG. 9 is a flowchart showing steps of a procedure of control device 50. FIG. 9 shows steps of a procedure performed by control device 50 when AC system 80 is restored from a power failure state. Typically, each step below is performed by operation processing unit 70 of control device 50. It is assumed here that control device 50A has been activated at the start of the flow shown in FIG. 9.

Referring to FIG. 9, control device 50 determines whether initial charge of power converter 2 is complete (step S10). Specifically, control device 50 determines whether power converter 2 has been charged to a voltage at which power converter 2 can be activated based on the power supplied from control device 50A through DC power transmission line 14. Control device 50 receives signal 17 indicating a cell capacitor voltage from each submodule 7, and when the cell capacitor voltage has risen to a predetermined voltage, determines that the initial charge of power converter 2 is complete.

If the initial charge is not complete (NO at step S10), control device 50 repeats the process of step S10. If the initial charge is complete (YES at step S10), control device 50 opens bypass switch 32 (step S12). Subsequently, control device 50 switches the tap position such that transformer 13 outputs the smallest voltage to AC system 80 (step S14).

Control device 50 sets an output voltage value of power converter 2 (step S16). Specifically, control device 50 sets the output voltage value to a voltage value at which circuit breakers 41 and 42 are opened while each submodule 7 is not stopped when a fault has occurred in power transmission line L. The processes of steps S10 to S16 are processes for preparing the activation of power converter 2 and are performed in random order or simultaneously.

Control device 50 activates power converter 2 (step S18). Specifically, control device 50 operates power converter 2 so as to perform a constant voltage constant frequency control operation. Subsequently, control device 50 closes AC circuit breaker 12 (step S20) and transmits closing information indicating that AC circuit breaker 12 has been closed to central control device 90 (step S22), thus ending the process.

FIG. 10 is a flowchart showing steps of a procedure of protection device 60. FIG. 10 shows steps of a procedure performed by protection device 60 when AC system 80 is restored from a power failure state. Typically, each of the following steps is performed by the operation processing unit of protection device 60. It is assumed here that at the start of the flow shown in FIG. 10, circuit breakers 41 and 42 are opened.

Referring to FIG. 10, protection device 60 determines whether it has received the closing information about AC circuit breaker 12 from central control device 90 (step S50). If not receiving closing information (NO at step S50), protection device 60 repeats the process of step S50. If receiving closing information (YES at step S50), protection device 60 closes circuit breakers 41 and 42 (step S52).

Protection device 60 determines whether a fault has occurred in power transmission line L based on the quantity of electricity of power transmission line L (step S54). If a fault has occurred (YES at step S54), protection device 60 opens circuit breakers 41 and 42 (step S56), thereby ending the process. In this case, for example, protection device 60 notifies central control device 90 that a fault has occurred in power transmission line L.

If a fault has not occurred (NO at step S54), protection device 60 keeps circuit breakers 41 and 42 closed, thereby ending the process. Consequently, generator 81 is activated, and the power is supplied to load 82, thereby completing the work of restoring AC system 80 from a power failure.

Advantages

The present embodiment can open circuit breakers 41 and 42 while submodule 7 are not stopped even when a fault has not been removed completely from AC system 80 in restoration of AC system 80 from a power failure. This enables accurate determination of a section in which a fault has occurred and also rapid restoration of the AC system from a power failure. Also, a current flowing from power converter 2 to AC system 80 is restricted, thereby reducing effects on each system apparatus provided in a power system.

Other Embodiments

The above embodiment has described the configuration in which power converter 2, 2A is a modular multilevel converter, the present invention is not limited to this configuration. For example, the circuit type of power converter 2, 2A may be configured by a two-level converter that converts AC power to two-level DC power or a three-level converter that converts AC power to three-level DC power.

Although the above embodiment has described the configuration in which control device 50 and protection device 60 exchange information through central control device 90, the present invention is not limited to this configuration. For example, control device 50 and protection device 60 may be configured so as to directly communicate with each other.

In the above embodiment, when circuit breakers 41 and 42 can be opened without turning off switching elements 22A and 22B through restriction of a fault current by limiting resistor 31, the output voltage of power converter 2 may have a rated voltage value. Similarly, when circuit breakers 41 and 42 can be opened without turning off switching elements 22A and 22B through restriction of a fault current by tap position control, the output voltage of power converter 2 may have a rated voltage value.

The configuration illustrated as the above embodiment is an example of the configuration of the present invention, and can be combined with another publicly known technique or can be changed, for example, partially omitting the configuration, within the scope of the present invention.

In the above embodiment, the process or configuration described in the other embodiment may be adopted as appropriate.

It should be understood that the embodiments disclosed herein are illustrative and non-restrictive in every respect. The scope of the present invention is defined by the terms of the claims, rather than the description above, and is intended to include any modifications within the meaning and scope equivalent to the terms of the claims.

REFERENCE SIGNS LIST 2, 2A power converter, 4u, 4v, 4w leg circuit, 5 upper arm, 6 lower arm, 7 submodule, 8A, 8B reactor, 9A, 9B arm current detector, 10 AC voltage detector, 11A, 11B DC voltage detector, 12, 12A AC circuit breaker, 13, 13A transformer, 14N, 14P DC power transmission line, 16, 43, 44 AC current detector, 18, 19 AC bus, 20HB conversion circuit, 21 gate controller, 22A, 22B switching element, 23A, 23B diode, 24 DC capacitor, 24N, 24P opposite end, 26N, 26P I/O terminal, 27 voltage detector, 28 transmitter/receiver, 30, 30A limiter circuit, 31 limiting resistor, 32 bypass switch, 41, 42 circuit breaker, 45, 46 voltage detector, 50, 50A control device, 51 auxiliary transformer, 52 AD conversion unit, 60 protection device, 70 operation processing unit, 71 bus, 72 CPU, 73 ROM, 74 RAM, 75 DI circuit, 76 DO circuit, 77 input interface, 78 communication interface, 80, 80A AC system, 81 generator, 82 load, 90 central control device, 102, 202 signal receive unit, 104, 204 information communication unit, 110 command generation unit, 112 converter control unit, 114, 206 circuit breaker control unit, 116 switch control unit, 118 tap control unit, 120 voltage setting unit, L power transmission line, Nn low-potential-side DC terminal, Np high-potential-side DC terminal, Nu, Nv, Nw AC input terminal.

The invention claimed is:
1. A power control system comprising:
a self-commutated power converter including a first arm and a second arm and configured to perform power conversion between a DC system and an AC system, each arm including one or more switching elements;

a first circuit breaker configured to interrupt a current flowing through a power transmission line provided between a first bus and a second bus of the AC system;
a first circuit breaker control unit configured to control the first circuit breaker based on a quantity of electricity of the power transmission line;
a converter control unit configured to stop the one or more switching elements based on a value of a first arm current flowing through the first arm and a value of a second arm current flowing through the second arm; and
a setting unit configured to set a voltage value of an AC voltage output from the power converter such that even when a fault occurs in the power transmission line, the first circuit breaker is opened while the one or more switching elements are not stopped,
wherein the converter control unit is configured to operate the power converter as a voltage source by switching the one or more switching elements such that when the AC system is restored from a power failure state, an AC voltage with the voltage value set by the setting unit is output through constant voltage control.

2. The power control system according to claim 1, wherein the first circuit breaker control unit is configured to
close the first circuit breaker after the converter control unit operates the one or more switching elements, and
when detecting a fault in the power transmission line by a protection computation using the quantity of electricity of the power transmission line after the first circuit breaker is closed, open the first circuit breaker and lock the first circuit breaker in an open state.

3. The power control system according to claim 2, further comprising a second circuit breaker control unit configured to control a second circuit breaker provided between the first bus and the power converter,
wherein the second circuit breaker control unit is configured to close the second circuit breaker after the converter control unit operates the one or more switching elements and before the first circuit breaker is closed.

4. The power control system according to claim 2, wherein
each of the first arm and the second arm includes a plurality of submodules connected in series with each other, and
each of the submodules includes
a switching element, and
a diode and a capacitor connected in parallel with the switching element.

5. The power control system according to claim 1, further comprising a second circuit breaker control unit configured to control a second circuit breaker provided between the first bus and the power converter,
wherein the second circuit breaker control unit is configured to close the second circuit breaker after the converter control unit operates the one or more switching elements and before the first circuit breaker is closed.

6. The power control system according to claim 5, wherein
each of the first arm and the second arm includes a plurality of submodules connected in series with each other, and
each of the submodules includes
a switching element, and
a diode and a capacitor connected in parallel with the switching element.

7. The power control system according to claim 1, wherein
the power converter is connected to a limiter circuit for limiting a current flowing between the first bus and the power converter,
the limiter circuit includes
a limiting resistor, and
a switch connected in parallel with the limiting resistor, and
the power control system further comprises a switch control unit configured to open the switch before the converter control unit operates the one or more switching elements.

8. The power control system according to claim 1, further comprising a tap control unit configured to perform switch control for switching a tap position of a transformer provided between the first bus and the power converter,
wherein the tap control unit is configured to switch to a tap position at which a voltage output from the transformer to the first bus attains to a lowest voltage value before the converter control unit operates the one or more switching elements.

9. The power control system according to claim 1, wherein
each of the first arm and the second arm includes a plurality of submodules connected in series with each other, and
each of the submodules includes
a switching element, and
a diode and a capacitor connected in parallel with the switching element.

10. A control device for controlling a self-commutated power converter configured to perform power conversion between a DC system and an AC system, the power converter including a first arm and a second arm each including one or more switching elements, the control device comprising:
a converter control unit configured to stop the one or more switching elements based on a value of a first arm current flowing through the first arm and a value of a second arm current flowing through the second arm; and
a setting unit configured to set a voltage value of an AC voltage output from the power converter such that even when a fault occurs in a power transmission line provided between a first bus and a second bus of the AC system, a circuit breaker configured to interrupt a current flowing through the power transmission line based on a quantity of electricity of the power transmission line is opened while the one or more switching elements are not stopped,
wherein the converter control unit is configured to operate the power converter as a voltage source by switching the one or more switching elements such when the AC system is restored from a power failure state, that an AC voltage with a voltage value set by the setting unit is output through constant voltage control.

11. A control device according to claim 10, wherein
the power converter is connected to a limiter circuit for limiting a current flowing between the first bus and the power converter,
the limiter circuit includes
a limiting resistor, and
a switch connected in parallel with the limiting resistor, and the control device further comprises a switch control unit configured to open the switch before the converter control unit operates the one or more switching elements.

12. A control device for controlling a self-commutated power converter configured to perform power conversion between a DC system and an AC system, the power converter including a first arm and a second arm each including one or more switching elements, the control device comprising:
- a converter control unit configured to stop the one or more switching elements based on a value of a first arm current flowing through the first arm and a value of a second arm current flowing through the second arm; and
- a setting unit configured to set a voltage value of an AC voltage output from the power converter such that when a fault occurs in a power transmission line provided between a first bus and a second bus of the AC system, a circuit breaker configured to interrupt a current flowing through the power transmission line based on a quantity of electricity of the power transmission line is opened while the one or more switching elements are not stopped, wherein the converter control unit is configured to operate the one or more switching elements such that an AC voltage with the voltage value set by the setting unit is output, the control device further comprises a tap control unit configured to perform switch control for switching a tap position of a transformer provided between the first bus and the power converter, and the tap control unit is configured to switch to a tap position at which a voltage output from the transformer to the first bus attains to a lowest voltage value before the converter control unit operates the one or more switching elements.

* * * * *